Jan. 17, 1961   J. G. PINTA ET AL   2,968,570
METHOD OF PREPARING HAMS
Filed Sept. 5, 1957
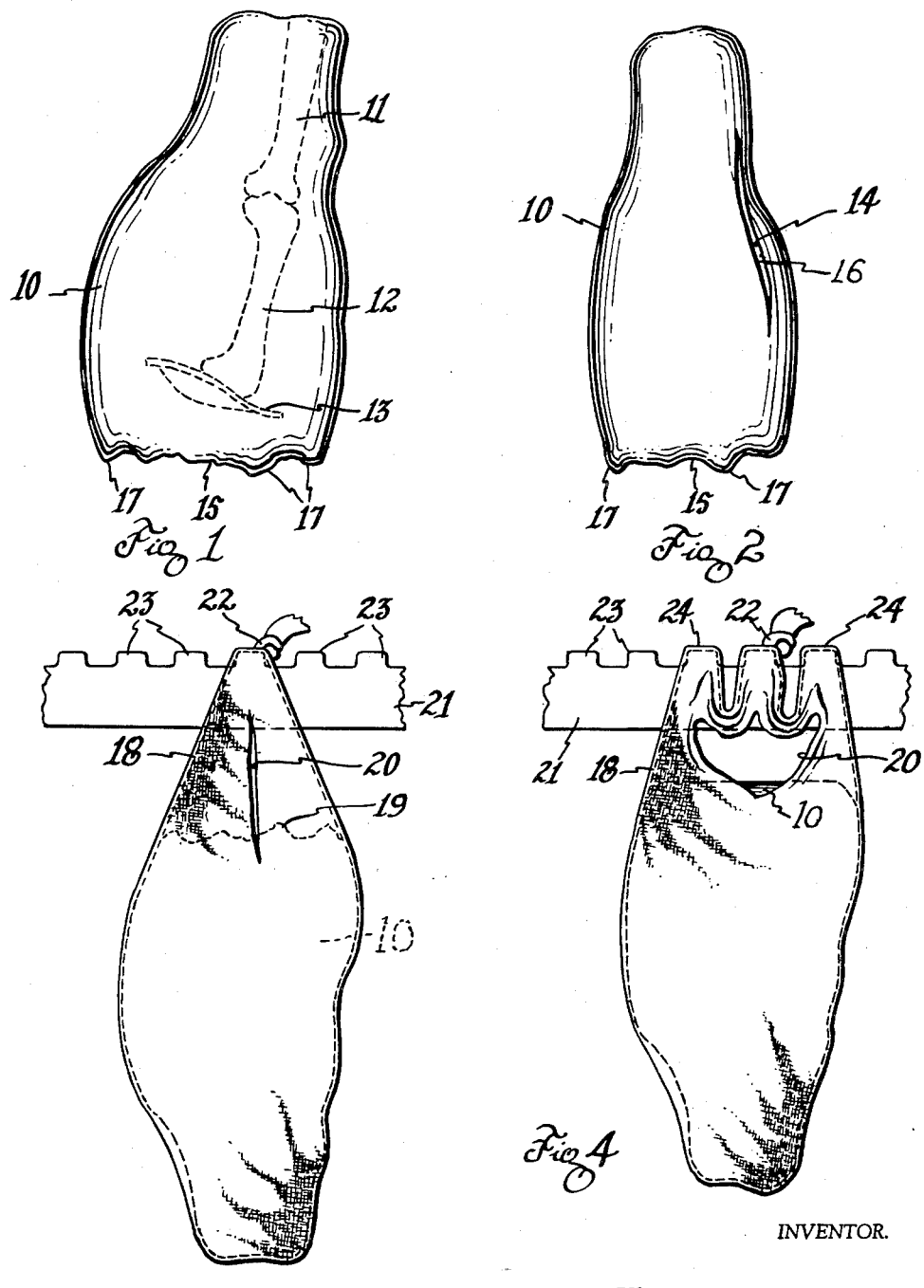
INVENTOR.
BY John F Brezina

United States Patent Office 2,968,570
Patented Jan. 17, 1961

2,968,570
METHOD OF PREPARING HAMS

John G. Pinta and Lawrence G. Eisen, Chicago, Ill., assignors to Reliable Packing Company, Chicago, Ill., a corporation of Illinois Filed Sept. 5, 1957, Ser. No. 682,250

3 Claims. (Cl. 99—229)

Our invention is directed to a novel method of preparing easily carvable and sliceable hams in which a part of the bones have been removed and wherein the cavities formed by removal of certain bones have been filled by pressing the hams to desirable shapes.

Among objectionable features of pork hams prepared by presently known and presently practiced methods are:

Numerous consumers and the restaurant and hotel trades will not purchase hams containing therein the usual bones due to the difficulty and problems of carving, dividing or slicing the hams to pieces of desirable sizes for serving. Attempts to slice and carve hams which have been prepared and baked with the femur and shank bones therein results in pieces and fragments of irregular size and partially broken due to the necessity of slicing and carving only to the area of the bones and then cutting or tearing off the resulting pieces of size less than the normal area of the portion of the ham being cut.

Another objectionable feature is that when the bones are trimmed out by the usual cutting the result is that the ham has relatively large cavities therein which have been formed by removal of the bones, and elimination of which is highly advantageous and desirable from the standpoint of commercial and consumer acceptability and of cooking, baking and carving of the ham.

Another objectionable feature has been that the manual trimming out of the bones, even where certain thereof are removed partially longitudinally with respect to the ham, results in uneven end pieces which have a plurality of irregular projections, with the result that the first several slices cut from the butt of the ham will comprise relatively small irregular and recessed and unshapely pieces which are in most instances undesirable for modern serving.

It is, accordingly, among the objects and accomplishments of our invention to provide:

(a) A ham having the femur and aitch bones removed therefrom and which is devoid of any substantial interior cavities or recesses, and which is of desirable and natural shape.

(b) Hams in which the normally projecting meat parts on the opposite ends of the hams have been flattened out to form substantially flat end portions capable of being sliced by usual transverse cuts to produce oval and rounded sliced pieces of desirable size and appearance and which slices are devoid of openings and recesses, and which permit better predetermined size and portion control of pieces to be cut and served.

(c) To provide a novel method of preparing hams which include the steps of proper curing, soaking, boning, mounting in fabric stockinettes, and pressing and manually flattening out the end portions of the hams after the same have been hung within stockinettes to produce a more desirable shape and appearance, and then smoking hams to the desired degree.

On the drawings:

Fig. 1 is a side elevation of a typical pork ham with the usual bones shown in dotted lines.

Fig. 2 is an elevation looking at the thinner "edge" side of the ham, illustrating the slit opening which is formed therein for removal of the femur and aitch bones.

Fig. 3 is an elevation illustrating the manner of temporarily suspending the ham with the said two bones removed, within a partially slit stockinette bag.

Fig. 4 is an elevation illustrating the manner of enclosing and suspending a deboned ham by means of a stockinette or fabric bag to provide for inward compressing and evening of the shank end face of the hams.

In the preparation of boneless hams according to our novel method, each of which initially contains the usual femur, shank bone and aitch bone, the hams are first cured in a suitable brine solution for approximately five days, after which said hams are removed from the brine and then soaked in water of not less than 65° F. to 75° F. for approximately two hours. This makes the meat mass relatively soft and pliable.

Numeral 10 designates the ham having the usual shank bone 11, femur 12 and aitch bone 13. The aitch bone 13 is first removed with the aid of a knife. A slit or hole of limited size is cut at the joint of the femur 12 and the shank bone 11 and opening on the thinner edge side of the ham. The cartilage and tendons surrounding the joint are first cut and the joint is thereby loosened. Thereupon, with the aid of a sharp chisel or chisel-like tool, the femur bone 12 is cut away from the surrounding fibers and meat mass, and then it is pulled longitudinally through the opening 14 which was previously formed for the removal of the aitch bone 13.

We prefer that the shank bones remain in the hams, which aids in maintaining the shape of the ham and facilitates handling. Another advantageous feature of leaving the shank bone in the ham is that numerous customers use the smaller reduced end portion of the ham having the shank bone therein to prepare soup, this usually after the ham has been carved or sliced substantially to the inner end of the contained shank bone. In one modified form of our method, we also remove the shank bone by forming a longitudinal slit in the ham, and cutting and pulling the same out.

After the aforesaid removal of the femur and aitch bone the resulting partially boned ham has an elongated, longitudinally extending irregularly shaped cavity 16, usually with a number of smaller contiguous interior cavities and inward projections (not shown), and also has irregularly shaped outwardly projecting portions of meat 17 extending from the butt end of the ham to present an irregular, uneven face which presents an undesirable appearance, and which when sliced transversely would produce undesirable, uneven and irregular pieces. The reduced shank end of the ham is placed in a flexible stockinette bag 18 first so that the reduced shank portion extends downwardly to engage the bottom portion of the bag. Said stockinette bags are generally of substantially conical shape, with the lower end portions gradually reduced. This causes the upper portion of the bag to assume a substantially conical shape when the bag is suspended on a hook, or the like. The weight of the suspended relatively soft ham, when placed in the stockinette bag 18, causes the portions of the ham surrounding the interior cavity to be moved and pressed inwardly to fill the cavity which was formed by removal of the femur and the aitch bone. At the same time, the parts of the meat 17 at outer edge portions of the butt end of the ham are pushed and moved slightly upwardly due to the transverse pressure of the stockinette bag so that an irregular, uneven face as partially illustrated in Figs. 1 and 2 is presented by the butt end and the transverse dimension of the soft suspended ham is slightly reduced.

After the soft ham is placed into the stockinette bag 18 with the shank end downward, the end of the bag is knotted or tied as at 22 (Fig. 3), and the knotted portion is hung upon one of a plurality of projecting lugs 23 of a metal smoke tree 21. Such smoke trees 21 comprise one or two horizontal extending metal bars which have a plurality of upwardly bending spaced apart serrations which thereby provide correspondingly spaced apart upwardly extending lugs or hooks 23.

An upwardly and downwardly extending slit 20 is cut with a knife in the upper hollow cone-shaped portion of the stockinette bag 18, such slit 20 being of sufficient size to permit insertion of a worker's hand. Thereupon, the worker, while the mass of meat is soft, will insert his hand through said opening formed by the slit and will repeatedly press downwardly and upon the projecting and irregular parts of the butt end 19 of the ham to thereby substantially flatten the butt end of the ham to produce a substantially flat shape and face and improve the appearance, and provide for the ultimate slicing and carving of relatively flat regular pieces of the ham from the butt end.

After the slit 20 is cut in the upper hollow portion of the net bag 18, the portions of the net bag on opposite sides of said slit 20 are gripped, raised, and hooked over two of the adjacent lugs on the opposite sides of the lug on which the knotted portion of the under bag was originally hung, as illustrated at numerals 24 in Fig. 4. This movement raises the ham slightly and places gravity-produced stress on the outer and side portions of the ham to thereby additionally press inward the side portions of the soft ham, to thereby cause a further compacting and filling of the interior cavities of the ham. This additional suspension of the side portions of the bag on additional adjacent lugs or hooks causes the opening formed of the vertical slit to become a relatively wide opening of the size sufficient to admit a worker's hand.

After the flattening of the butt end portion of the hams in the manner previously described, the hams, while suspended as described on the respective lugs on the smoke trees, are suspended in a smokehouse where they are subjected to the usual smoking process from 16 to 18 hours. Thereafter, the hams are placed in a chill room for at least several hours. Such chilling makes the ham relatively firm and rigid while retaining the before-described desirable compact shape, which shape will be retained during subsequent handling, display and sale. The substantial flatness of the butt ends of the hams produced as aforesaid provides for the first slices cut from the butt end of the ham being continuous, even, and desirably appearing pieces which can be served as ready-cut portions, in contrast with irregular, uneven, and separate pieces commonly produced by slicing hams prepared by presently known methods. The respective slices from hams prepared by our method will be solid, continuous and devoid of undesirable openings and cavities.

As many changes could be made in the above construction, and as many apparently widely different embodiments of our invention within the scope of the claims could be constructed without departing from the spirit and scope thereof, it is intended that all matter contained in the accompanying specification shall be interpreted as illustrative and not in a limiting sense.

We claim:

1. In a process of preparing easily sliceable and carvable hams having the femur and aitch bones removed therefrom, the method comprising curing the hams having the bones therein for approximately five days; then softening said hams by soaking in water of from 65° F. to 75° F. for approximately 2 hours; then cutting a hole adjacent the joint of the femur and shank bones and cutting the cartilage and tendons about said joint to thereby loosen said joint; then cutting out and removing the femur and aitch bone; thence mounting said hams in stockinette bags with the shank end portion of the ham against the bottom portion of the stockinette bags suspending the side portions of the stockinette bags to cause inward pressing of parts of the ham into the cavities thereof; then manually pressing the upper butt end portion of the suspended hams while the same are within said stockinette bags to flatten the butt faces and to press parts of the meat mass into the interior cavities formed by removal of said bones, and then smoking said hams for periods of from 16 to 18 hours while the same are suspended in said stockinette bags.

2. In a process of preparing easily sliceable and carvable hams having a part of the bones removed therefrom, the method comprising the steps of curing the hams with the bones therein for approximately five days; then softening said hams by soaking in water of from at least 65 to 75 degrees F. for approximately two hours; cutting a hole at the joint of the femur and shank bones and cutting the cartilage and tendons about said joint to thereby loosen said joint; then removing the femur and aitch bones by additional cutting; thence enclosing said boneless hams in fabric stockinette bags with the shank end portion of the ham against the bottom portion of the stockinette bags; then manually flattening and pressing downwardly the upper end portion of the suspended hams while the same are within said stockinette bags; then hanging the side portions of the stockinette bags on fixed members to cause pressing inward of parts of the ham into the interior cavities thereof; and then smoking approximately 16 hours and chilling said hams while the same are suspended in said stockinette bags.

3. In process of preparing and protectively enclosing easily sliceable hams, the method comprising, curing the hams for approximately five days and then soaking the hams in water of a temperature of at least 65° F. for approximately two hours; slitting the sides of the hams to form an opening to the femur and aitch bones; removing the femur and aitch bones by cutting; then placing said hams with shank end downward into flexible stockinette bags; suspending the stockinette enclosed hams with respect to a fixed support, the said suspension of the hams in said stockinette bags causing portions of the ham to be pressed inwardly to fill the interior cavities formed by the removal of the femur and aitch bones by means of the weight of the ham; slitting the upper poriton of the bags to provide an opening; raising the lateral upper side portions of the bags above said hams and suspending said upper portion on an additional fixed support; and then manually pressing inwardly and downwardly the butt portion of the hams to produce a substantially even butt face and to cause inner portions of said ham to fill the cavities formed by removal of said bones; and then smoking said hams for periods of approximately sixteen hours.

References Cited in the file of this patent

UNITED STATES PATENTS

| | | |
|---|---|---|
| 844,096 | Burk | Feb. 12, 1907 |
| 1,631,463 | Britt | June 7, 1927 |
| 1,971,460 | McKee | Aug. 28, 1934 |
| 2,182,891 | Eikel | Dec. 12, 1939 |
| 2,299,946 | Alkire | Oct. 27, 1942 |